US000001832H

United States Statutory Invention Registration [19]

[11] Reg. Number: H1,832

Ellis [45] Published: Feb. 1, 2000

[54] ELECTROMAGNETICALLY TRANSPARENT FLUIDIC OPERATORS FOR REMOTE OPERATION OF ELECTRIC SWITCHES AND METHOD OF ADAPTING ELECTRIC SWITCHES FOR REMOTE, FLUIDIC OPERATION

[75] Inventor: Vincent Ellis, Catleh, Va.

[73] Assignee: The United States of America as represented by the Secretary of the Army, Washington, D.C.

[21] Appl. No.: 08/668,454

[22] Filed: Jun. 3, 1996

[51] Int. Cl.[7] ..... H01H 35/34

[52] U.S. Cl. ..... 200/83 R

[58] Field of Search ..... 307/118; 340/626; 92/5 R, 94, 96, 101, 102; 73/717, 723, 861.47; 200/81 R, 81.4, 81.5, 302.1, 330, 331, 332.1, 83 R, 83 S, 83 A, 83 B, 83 J, 83 SA

[56] References Cited

U.S. PATENT DOCUMENTS

| | | | |
|---|---|---|---|
| 3,626,122 | 12/1971 | Horton | 200/83 E |
| 4,037,317 | 7/1977 | Bauer et al. | 29/622 |
| 4,155,572 | 5/1979 | Bretone, Jr. | 285/197 |
| 4,225,760 | 9/1980 | Griffith | 200/83 R |
| 4,468,532 | 8/1984 | Clark et al. | 200/81.9 |
| 4,755,638 | 7/1988 | Geberth, Jr. | 200/82 |
| 4,855,545 | 8/1989 | Kreuter | 200/81.4 |
| 4,900,883 | 2/1990 | Brame et al. | 200/83 |
| 4,939,446 | 7/1990 | Rogers | 324/72 |
| 5,139,357 | 8/1992 | Reents | 401/146 |

OTHER PUBLICATIONS

Bristol Babcock Instruments/Systems, Model 506019, 506038 and 506039 Pressure Switches for gauge pressures. Copyright date 1988, United States.

*Primary Examiner*—Daniel T. Pihulic
*Attorney, Agent, or Firm*—William E. Eshelman

[57] ABSTRACT

An electromagnetically transparent fluidic operator for adapting a conventional, mechanically operated electric switch to remote, fluidic operation includes a non-metallic housing for being rigidly attached to the electric switch with a chamber in the housing aligned with a mechanical actuator of the electric switch and a non-metallic, expandable reservoir mounted by the housing. The reservoir includes a nipple rigidly attached to the housing and a deformable diaphragm forming a seal with the nipple and being disposed in the chamber close to the mechanical actuator. The reservoir is pressurized with fluid from a remote location causing the diaphragm to deform and the reservoir to expand thereby applying a positive pressure or operating force against the mechanical actuator to operate the electric switch. A method of adapting an electric switch for remote, fluidic operation includes the steps of rigidly attaching the housing to a selected electric switch such that the chamber in the housing is aligned with the mechanical actuator, positioning the diaphragm in the chamber close to the mechanical actuator, rigidly attaching the nipple to the housing, establishing a seal between the nipple and the diaphragm to form a fluid-tight reservoir and supplying fluid to the reservoir to deform the diaphragm and apply the operating force against the mechanical actuator.

19 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTROMAGNETICALLY TRANSPARENT FLUIDIC OPERATORS FOR REMOTE OPERATION OF ELECTRIC SWITCHES AND METHOD OF ADAPTING ELECTRIC SWITCHES FOR REMOTE, FLUIDIC OPERATION

BACKGROUND OF THE INVENTION

1. Field of the Invention

The present invention relates generally to remote, pressure operation of electric switches and, more particularly, to electromagnetically transparent fluidic operators adapted to conventional electric switches for operating the electric switches remotely and to a method of adapting electric switches for remote, fluid operation.

2. Description of the Prior Art

When testing battery operated systems to electromagnetic stimulus, such as in electromagnetic interference studies and radiated susceptibility studies, it is desirable to switch the system power "on" and "off" between test shots to conserve battery charge. It is further desirable to switch the system power "on" and "off" from a remote location to eliminate down times associated with accessing the systems directly. Attempts to modify the original power supplies for the systems to permit remote switching such as, for example, by adding at least a remotely operable switch and a remote control receiver, are usually incompatible with electromagnetic testing due to the size, configuration and cost of the modifications as well as the effect the modifications have on the electromagnetic coupling characteristics of the systems. In addition, different systems to be tested typically require different switch designs in accordance with the size, weight and power requirements of the systems. The specialized switch designs of diverse systems are often not amenable to modification for remote switching and, even where modification is possible, the modifications are often not cost-effective to undertake and/or reproduce.

Remotely operable electric switches using pressure, such as fluid pressure, radiation pressure and sound pressure, as the switching signal have been proposed for remote operation. Remote, pressure operated electric switches typically employ various mediums as control links including liquid, gas, light, electrical radiation and sound. Representative of prior art pressure operated electric switches are U.S. Pat. Nos. 5,139,357 to Rents, 4,900,883 to Brane et al, 4,855,545 to Kreuter, 4,755,638 to Geberth, 4,468,532 to Clark et al and 4,037,317 to Bauer et al as well as Models 506019, 506038 and 506039 of pressure switches manufactured by Bristol Babcock, Inc.

Conventional electric switches redesigned or modified for remote operation as well as conventional, remotely operable electric switches including those that are pressure operated are frequently not suitable for use in electromagnetic testing. Most conventional, remotely operable electric switches have a high metallic content and require expensive support hardware, such as a remote transmitter, receiver and/or communication link. Conventional electric switches having radio frequency control links are incompatible with electromagnetic testing due to possible interference of the RF switch signal and the RF test signal as are hard wired switches with metallic wires that can corrupt the electromagnetic characteristics of the associated system. Although fiber optics/light controlled switches are suitable for use in electromagnetic testing, the latter switches have the disadvantages of requiring an electronic transmitter and receiver, necessitating a specialized design depending on the power requirements of the system, and adding some amount of extraneous metal, in addition to the electric switch, to the system due to the fiber optic receiver imbedded therein. Furthermore, fiber optic transmitter circuitry within the system can be susceptible to electromagnetic test fields causing the circuitry to function improperly. Liquid pressure switches can be compatible with electromagnetic testing where the liquid is non-conductive; however, complications from leaking present an unacceptable risk. Although air-operated pressure switches are theoretically compatible with electromagnetic testing, conventional air-operated pressure switches are prohibitively large and comprise metallic components. Modifications or adaptations of conventional air operated electric switches are typically not easily applicable to different types of electric switches, for example, single pole double throw and double pole double throw electric switches. Indeed, many prior art remotely operable electric switch designs are themselves complete switches and not modifications of existing, off-the-shelf electric switches. Accordingly, the prior art has thus far been deficient in providing an electromagnetically transparent adaptation of an existing electrical switch to allow the electric switch to be operated remotely.

SUMMARY OF THE INVENTION

Accordingly, it is a primary object of the present invention to overcome the aforementioned disadvantages of the prior art.

Another object of the present invention is to provide an electromagnetically transparent, low-cost adaptation of a conventional electric switch allowing the electric switch to be operated from a remote location.

A further object of the present invention is to operate an electric switch remotely during electromagnetic experimentation to conserve the power of a system with which the electric switch is associated.

An additional object of the present invention is to apply an operating force against the mechanical actuator of a conventional electric switch utilizing a deformable, non-metallic diaphragm disposed close to the mechanical actuator and confined by a non-metallic housing mounted on the electric switch such that the diaphragm applies force against the mechanical actuator when deformed by fluidic pressure.

It is also an object of the present invention to move a mechanical actuator of a conventional electric switch utilizing an electromagnetically transparent, fluid-tight, expandable reservoir rigidly mounted in alignment with the mechanical actuator with the reservoir being expanded to move the mechanical actuator in response to fluidic pressurization of the reservoir.

Yet another object of the present invention it to selectively adjust the pressurization required in the reservoir to move the mechanical actuator.

Some of the advantages of the present invention are that battery power of systems undergoing electromagnetic experimentation is conserved between test shots, down times during electromagnetic testing are minimized, the fluidic operators can be mounted on conventional electric switches in many various ways for operation in various positions, the fluidic operators are adaptable to many different types of conventional electric switches of different sizes and configurations, the fluidic operators can be easily made or fabricated from readily available materials, the fluidic operators add nothing metallic to the associated system that would affect the electromagnetic characteristics of the system, various different types of fluids can be utilized to deform the diaphragm of the fluidic operators and operation of the electric switches can be obtained in response to predetermined pressures within the reservoirs of the fluidic operators.

These and other objects, advantages and benefits are realized with the present invention as characterized in an electromagnetically transparent fluidic operator for being mounted to a selected, conventional electric switch to form a remotely operable electric switch assembly. The electric switch includes a mechanical actuator movable to make or break an electric contact to operate the electric switch. The fluidic operator includes a non-metallic housing rigidly attached to the electric switch with a chamber in the housing aligned with the mechanical actuator. A non-metallic, fluid-tight reservoir is rigidly mounted by the housing and includes a hollow nipple rigidly attached to the housing and a deformable diaphragm disposed in the chamber and forming a fluidic seal with the nipple. The diaphragm is disposed close to the mechanical actuator of the switch; and, when the reservoir is pressurized with fluid from a remote source, the diaphragm deforms causing the reservoir to expand. The expanded, pressurized reservoir exerts an operating pressure or force against the mechanical actuator causing the mechanical actuator to move to operate the electric switch. The fluidic operator is made of electromagnetically transparent materials to be electromagnetically transparent at radio frequencies and to be electromagnetically translucent at microwave frequencies and does not add anything metallic to the electric switch. A method of adapting an electric switch for fluidic, remote operation according to the present invention includes the steps of rigidly attaching a non-metallic housing to a selected electric switch such that a chamber in the housing is aligned with the mechanical actuator of the switch, positioning a non-metallic, stretchable diaphragm in the chamber close to the mechanical actuator, rigidly attaching a non-metallic nipple to the housing, establishing a seal between the nipple and the diaphragm to form a fluid-tight reservoir, and supplying fluid to the reservoir to pressurize the reservoir and deform the diaphragm such that the fluidic pressure of the reservoir applies an operating force against the mechanical actuator to operate the electric switch.

Other objects and advantages of the present invention will become apparent from the following description of the preferred embodiments taken in conjunction with the accompanying drawings wherein like parts in each of the several figures are identified by the same reference characters.

DESCRIPTION OF THE PREFERRED EMBODIMENTS

Figure 1:
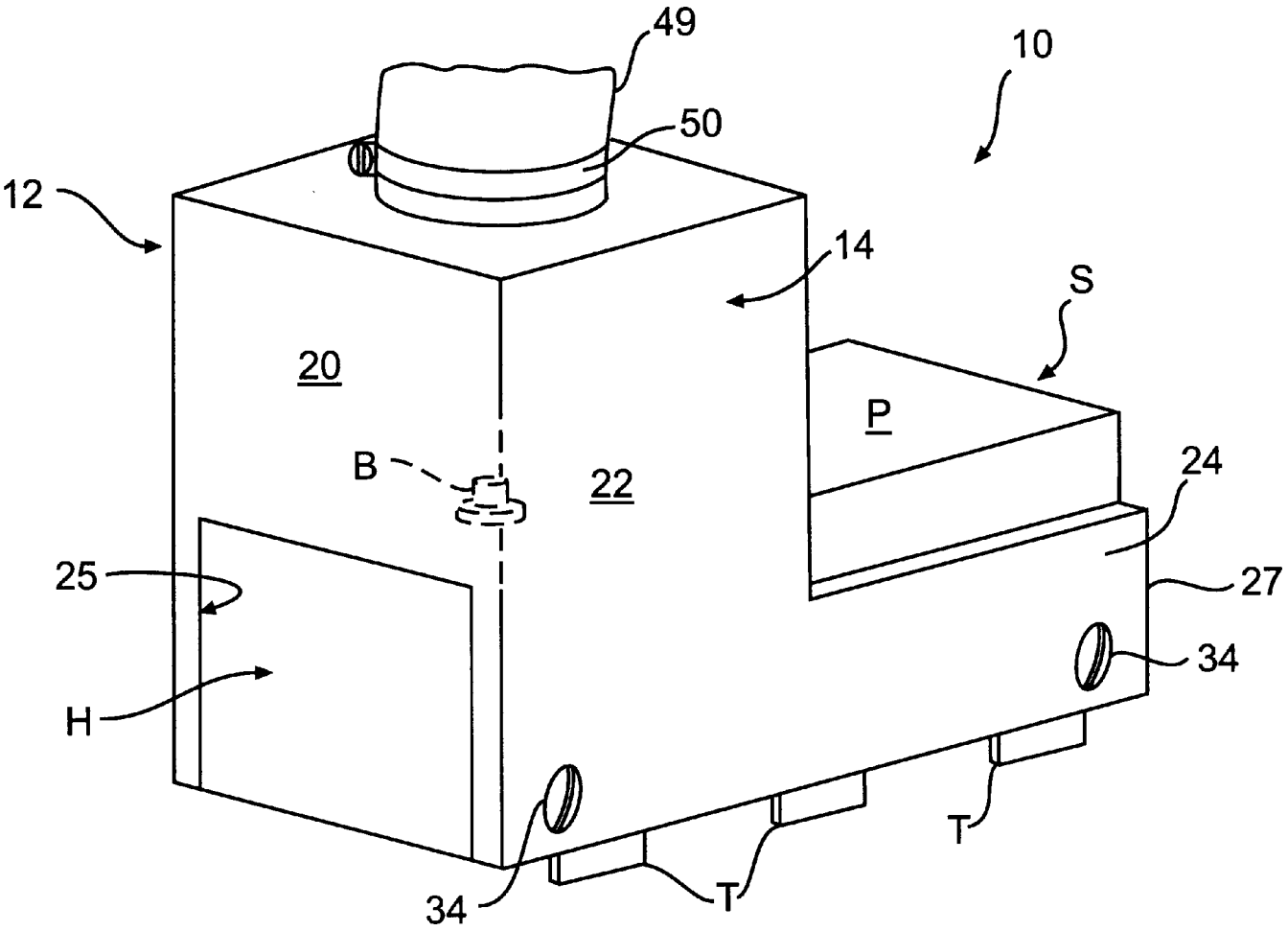
FIG. 1 is a broken, perspective view of an electromagnetically transparent fluidic operator according to the present invention mounted to an electric switch to form a remotely operable electric switch assembly.

A remotely operable electric switch assembly 10 according to the present invention is illustrated in FIG. 1 and comprises an electric switch S and an electromagnetically transparent fluidic operator 12 for electric switch S. Electric switch S is a conventional electric switch having a mechanical actuator for making or breaking an electrical contact to actuate "on" and "off" states. In the case of electric switch assembly 10, switch S is a momentary pushbutton electric microswitch having a rectangular housing H, mechanically operated electric contacts (not shown) within housing H, a mechanical actuator in the form of a pushbutton B and terminals T, such as normally open, normally closed and common. Pushbutton B is biased to protrude externally or outwardly from a planar, external surface P of housing H and is movable in an axial or longitudinal direction normal to the surface P to make or break an electric contact to operate switch S. For example, when pushbutton B is moved inwardly toward the surface P in response to an operating force or pressure applied thereto in the longitudinal direction, the electric contacts within housing H are closed to turn switch S "on". The switch S will remain in the "on" state as long as the operating force or pressure on pushbutton B is maintained. When the operating force or pressure on pushbutton B is removed, the pushbutton automatically moves away from the surface P in the longitudinal direction to open the electric contacts and thusly turn switch S "off". Although switch S for electric switch assembly 10 is a momentary pushbutton electric microswitch, it should be appreciated that various, diverse mechanically actuated electric switches can be utilized in the present invention.

Figure 2:
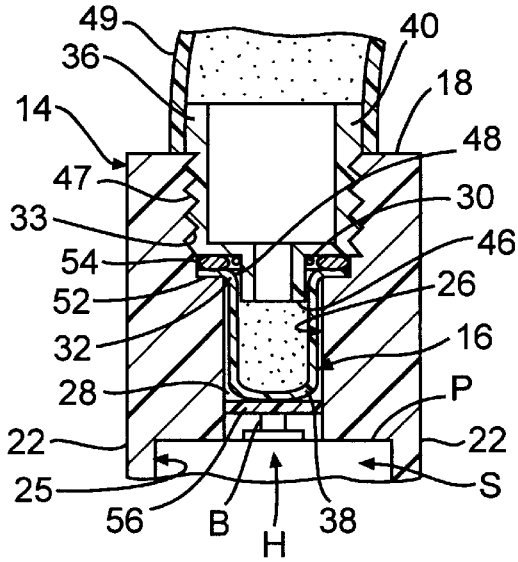
FIG. 2 is a broken, sectional view of the electric switch assembly of FIG. 1 showing the diaphragm of the fluidic operator in a non-deformed condition.

Electromagnetically transparent fluidic operator 12 includes a housing 14 mounted to electric switch S and an expandable reservoir or bladder 16, shown in FIG. 2, mounted by housing 14. As best shown in FIG. 1, housing 14 includes a planar, external upper surface 18, a pair of planar, external, parallel forward and rearward surfaces 20 perpendicular to upper surface 18 (only the forward surface 20 being visible in FIG. 1), a pair of planar, external, parallel side surfaces 22 perpendicular to upper surface 18 and forward and rearward surfaces 20 (only one side surface being visible in FIG. 1), and a pair of planar, parallel wings or extensions 24 merging with side surfaces 22 and extending rearwardly of the rear surface at a lower end of the housing 14 (only one wing being visible in FIG. 1). The lower end of housing 14 is open with a passage 25 therethrough having a configuration in cross-section corresponding to the cross-sectional configuration of switch housing H. Accordingly, the switch housing H can be positioned to extend through the passage 25 as shown in FIG. 1 with the housing H disposed between the side surfaces 22 and the wings 24 of housing 14, with the forward surface 20 of housing 14 aligned with a planar, external, forward surface of housing H, with a lower edge of housing 14 aligned with a lower surface of housing H from which terminals T protrude and with housing H protruding rearwardly of the rear surface of housing 14 such that a rear surface of housing H is aligned with rear edges 27 of wings 24. As shown in FIG. 2, an internal chamber or recess 26 is formed in an upper end of housing 14 in longitudinal or axial alignment with pushbutton B when the housing 14 is mounted to switch S. Chamber 26 includes a lower or inner, cylindrical chamber section 28 communicating with passage 25 and longitudinally or axially aligned with pushbutton B and an upper or outer, cylindrical chamber section 30 longitudinally aligned with lower chamber section 28. Outer chamber section 30 has an opening along upper surface 18 and a cross-sectional diameter or size greater than the cross-sectional diameter or size of the inner chamber section 28 such that an inwardly protruding shoulder 32 is defined within housing 14 at the junction of the upper and lower chamber sections. An internal wall of housing 14 defining the outer chamber section 30 is provided with threads 33 therealong. The housing 14 is rigidly attached or mounted to electric switch S with securing elements such as screws 34 extending through side walls of the housing 14 and into side walls of the housing H. The housing 14 can be made of any suitable electromagnetically transparent, non-metallic material, including polyvinylchloride, plexiglassρ, and acrylic, allowing electromagnetic waves to pass therethrough unobstructed. Accordingly, as used herein "electromagnetically transparent" has the same meaning that "transparent" has relative to light. Securing elements 34 can be made of any suitable electromagnetically transparent, non-metallic material including nylon, and the material of the securing devices can be the same as or different from the material of the housing 14.

Expandable reservoir or bladder 16 includes a hollow, rigid nipple 36 and an expandable, deformable, flexible or stretchable diaphragm 38. Nipple 36 has an upper or outer cylindrical portion 40, and a lower or inner cylindrical portion 46 depending from outer portion 40. Outer portion 40 has an open, upper or outer end and a lower end carrying external threads 47 for mating with threads 33 of housing 14. The inner portion 46 of nipple 36 has an open, inner or lower end and an external diameter or cross-sectional size smaller than the external diameter or cross-sectional size of the outer portion 40 to define an outwardly protruding shoulder 48 at the junction of the outer and inner portions. The inner portion 46 protrudes into the inner chamber section 28 of housing 14 when reservoir 16 is disposed in chamber 26. As shown in FIG. 2, when the nipple 36 is rigidly secured to the housing 14, a longitudinal axis of the nipple is aligned with the longitudinal direction of movement of pushbutton B normal to the upper surface P of housing H. Nipple 36 can be made of any suitable electromagnetically transparent, non-metallic material including the same materials from which housing 14 is constructed. One end of a fluid conduit 49 is connected with the open, outer end of outer portion 40 of the nipple to communicate with the hollow interior thereof, and the conduit 49 can be secured to the nipple with a compression clamp 50 if desired. Another end of conduit 49 is connected with a remote fluid supply allowing conduit 49 to supply fluid to reservoir 16 from a remote location. The end of conduit 49 coupled with the fluid supply can be provided with a valve such that the reservoir 16 and the lumen of the conduit 49 form a fluid or pressure tight enclosure, with the valve controlling the supply of fluid and the release of fluid from the reservoir. Although the conduit 49 is illustrated connected to the outer end of nipple 36, it should be appreciated that the fluid conduit can be connected to other parts of the nipple. The conduit 49 is made of a non-metallic material such as plastic or rubber.

Diaphragm 38 has a closed, lower or inner end and an open, upper or outer end having a peripheral edge 52 held between the nipple 36 and the housing 14. Diaphragm 38 is arranged in the inner chamber section 28 of housing 14 with the inner end thereof close to or adjacent pushbutton B and in alignment therewith. Peripheral edge 52 is disposed between shoulders 32 and 48. A compressive seal, such as a rubber O-ring 54, is disposed entirely along the peripheral edge 52 between the diaphragm 38 and the shoulder 48; and, when the nipple 36 is screwed to the housing 14, the seal 54 is compressed between the shoulders 32 and 48. Accordingly, seal 54 holds the diaphragm 38 in place and creates a fluidic seal between the nipple 36 and the diaphragm 38 such that the diaphragm defines or forms a sealed fluidic barrier between the interior of reservoir 16 and the pushbutton B. An annular pressure plate 56 having an external diameter or size to be received in the inner chamber section 28 of housing 14 is interposed between the inner end of diaphragm 38 and pushbutton B. The pressure plate 56 is illustrated as being in engagement with or supported on the pushbutton B; however, the pressure plate can be spaced from and not engaged with the mechanical actuator. The pressure plate can be freely movable in chamber 26 or the pressure plate can be attached to the diaphragm or the mechanical actuator. The diaphragm 38 can be made of any suitable electromagnetically transparent, non-metallic stretchable or expandable material such as latex rubber. The diaphragm 38 an be formed from conventionally available preformed rubber products. For example, the diaphragm can be a finger tip cut from a surgical glove or the reservoir tip of a prophylactic. The pressure plate 56 can be made of any suitable smooth, electromagnetically transparent, non-metallic material. For instance, the pressure plate can be cut from a thin, smooth sheet of plastic.

Figure 3:
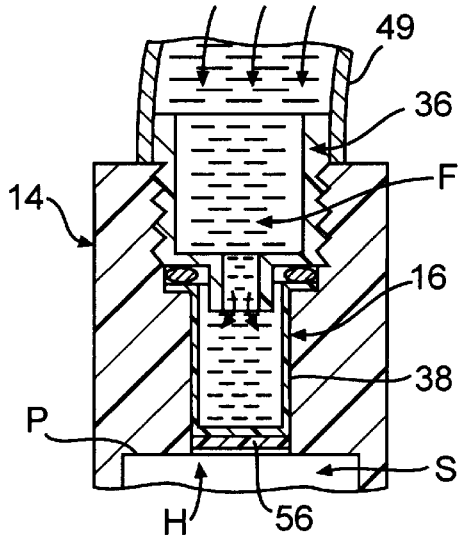
FIG. 3 is a broken, sectional view of the electric switch assembly of FIG. 1 showing the diaphragm in a deformed condition to operate the electric switch.

In use, an electric switch S is selected for adaptation and the fluidic operator 12 is assembled to the selected electric switch S as described above and as shown in FIGS. 1 and 2 with diaphragm 38 normally in an unexpanded, non-deformed or relaxed condition close to or adjacent pushbutton B. When it is desired to operate electric switch S remotely, fluid F such as compressed air is supplied to reservoir 16 via fluid conduit 49. Enough fluid is supplied to reservoir 16 to fluidically pressurize, expand or inflate the reservoir and because diaphragm 38 to deform, stretch or expand. As shown in FIG. 3, diaphragm 38 will then be in an expanded, deformed or stretched condition with reservoir 16 increasing in size in the longitudinal direction due to confinement of the diaphragm by the internal wall of housing 14 defining chamber 26. The housing 14 thusly aligns the deformation of diaphragm 38 with the mechanical actuator of the electric switch S. The sufficiently pressurized, expanded reservoir 16 will exert an operating force or positive pressure, in excess of atmospheric pressure, against pressure plate 56 to move the pressure plate 56 in the longitudinal direction normal to surface P to depress pushbutton B toward surface P as shown in FIG. 3. Accordingly, the electrical contacts within housing H will close causing the electric switch S to switch to the "on" state. The electric switch S will remain in the "on" state as long as a constant, positive fluidic pressure sufficient to depress pushbutton B is maintained in reservoir 16. With the switch in the "on" state, an electromagnetic experiment or test can be conducted on the system with which the switch is associated. When experimentation or testing is not being performed, the reservoir 16 is depressurized by releasing fluid via the fluid conduit 49. The diaphragm 38 will relax or return to the non-expanded condition causing the reservoir 16 to retract in size. The positive pressure or operating force on pushbutton B will be removed or will be insufficient to maintain the "on" state causing pushbutton B to move upwardly to again protrude from surface P. Accordingly, the electric contacts within housing H will open causing the electric switch S to switch to the "off" state. The system power can thusly be conserved prior to turning the switch "on" again when experimentation or testing is resumed.

Figure 4:
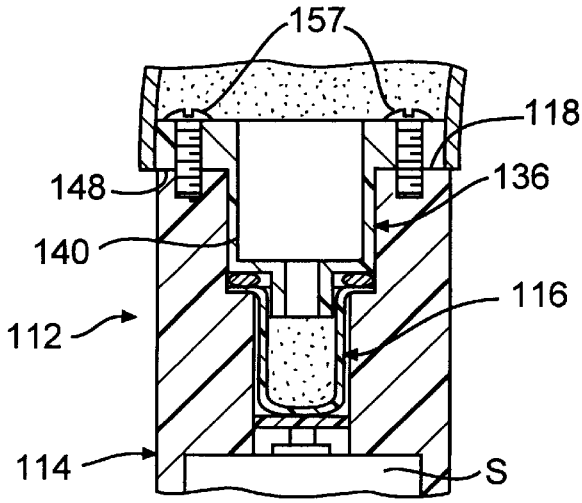
FIG. 4 is a broken, sectional view of a modification of an electromagnetically transparent fluidic operator according to the present invention mounted to an electric switch to form a remotely operable electric switch assembly.

An alternate embodiment of an electromagnetically transparent fluidic operator according to the present invention is illustrated at 112 in FIG. 4 wherein the fluidic operator 112 is mounted to electric switch S to form a remotely operable electric switch assembly. Fluidic operator 112 is substantially the same as fluidic operator 12 and includes housing 114 mounted to electric switch S and expandable reservoir 116 mounted by housing 114. Fluidic operator 112 differs from fluidic operator 12 in the manner in which nipple 136 is secured to housing 114. The outer portion 140 of nipple 136 has a cylindrical, protruding rim 148 at the outer end thereof for engaging upper surface 118 of housing 114. Screws 157 made of an electromagnetically transparent, non-metallic material are threaded through the protruding rim 148 and into the outer or upper end of housing 114 to rigidly secure the nipple 136 to the housing 114. It should be appreciated that the nipples can be attached to the housings of the fluidic operators in many various ways including adhesively, with clamps or with a zero-clearance pressure fit.

Figure 5:
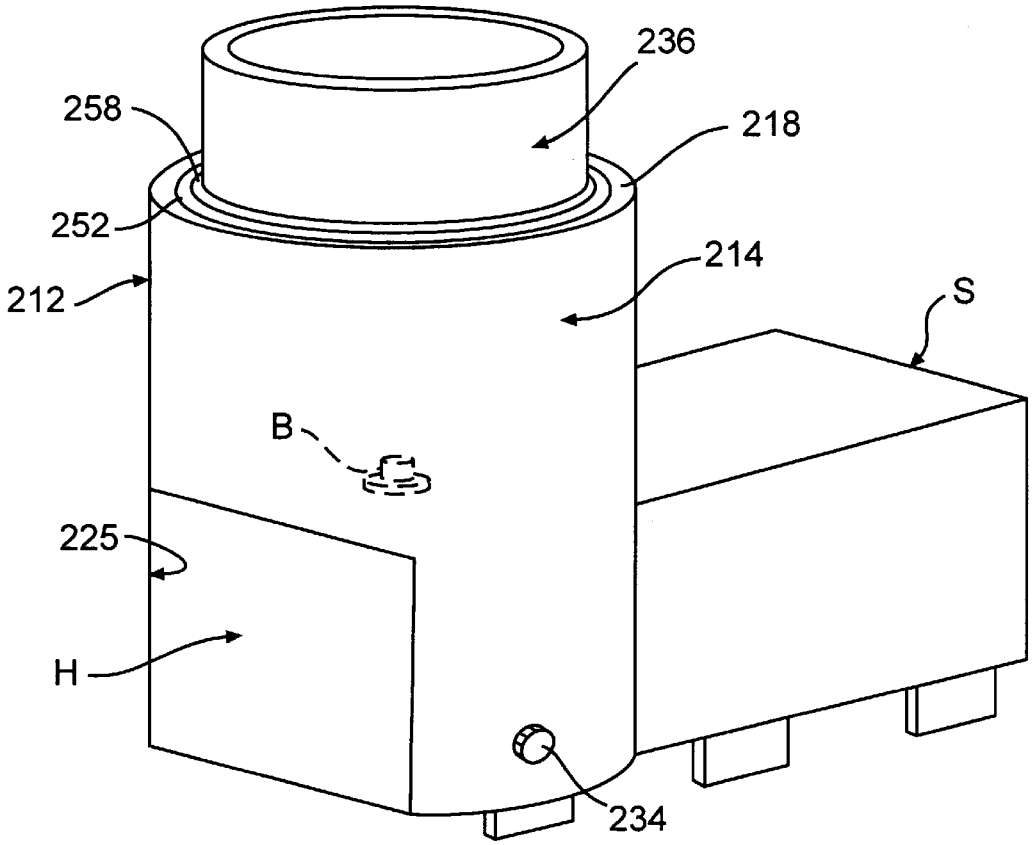
FIG. 5 is a perspective view of another modification of an electromagnetically transparent fluidic operator according to the present invention mounted to an electric switch to form a remotely operable electric switch assembly.
Figure 6:
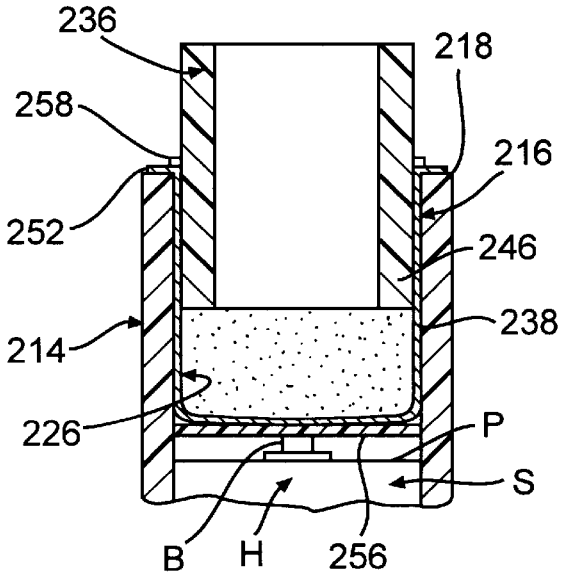
FIG. 6 is a broken, sectional view of the electric switch assembly of FIG. 5 showing the diaphragm of the fluidic operator in a non-deformed condition.

Another alternative embodiment of an electromagnetically transparent fluidic operator according to the present invention is illustrated at 212 in FIG. 5 wherein the fluidic operator 212 is mounted to electric switch S to form a remotely operable electric switch assembly. Fluidic operator 212 is exemplary of a very low-cost, simplistic adaptation made from readily available conventional materials or components. The housing 214 for fluidic operator 212 is made from a short length of non-metallic tubing, such as polyvinylchloride, having opposed sections cut from the wall thereof in alignment with one another at an inner end of the housing 214 to define passage 225. Accordingly, the housing H of electric switch S can be positioned to extend through the passage 225 with the housing 214 cradling the electric switch S and with the lumen or chamber 226 of housing 214 longitudinally or axially aligned with pushbutton B. Securing elements such as bolts 234, only one of which is shown in FIG. 5, extend through the sides of housing 214 at the inner end thereof and into the side walls of housing H for cooperating with nuts (not shown) to rigidly secure the fluidic operator 212 to the electric switch S. The bolts and nuts can be made of any suitable electromagnetically transparent, non-metallic material such as nylon. Nipple 236 is formed from a length of non-metallic tubing having an external diameter the same as or smaller than the internal diameter of housing 214 allowing nipple 236 to be pressed into the chamber of housing 214. An inner portion 246 of nipple 236 is received in diaphragm 238 with the peripheral upper edge 252 of the diaphragm protruding externally from the opening of chamber 226 along upper surface 218. An adhesive bead or seal 258 is disposed entirely around peripheral edge 252 to form a seal between the nipple 236 and the diaphragm 238. A pressure plate 256 is disposed between the inner end of diaphragm 238 and pushbutton B. The fluidic operator 212 is assembled by positioning the diaphragm 238 in the lumen or chamber 226 of housing 214 with the peripheral edge 252 protruding externally from the opening of chamber 226 along the upper surface 218 of housing 214 and the inner end of the diaphragm close to or adjacent pushbutton B. The nipple 236 is then pressed into the open outer end of the diaphragm 238, and the seal 258 is applied along the peripheral edge 252 such that the nipple 236 and the diaphragm 238 form the reservoir 216. Use of fluidic operator 212 is the same as that described above in that fluid is supplied to reservoir 216 via a fluid conduit (not shown) coupled with the open end of nipple 236 protruding externally of housing 214. The reservoir 216 is sufficiently pressurized with fluid to cause diaphragm 238 to move from a non-expanded condition to an expanded condition. The pressurized reservoir 216, which is confined by housing 214, will thusly expand or increase in size longitudinally to move pressure plate 256 toward the surface P of housing H to depress pushbutton B. When fluid is released from reservoir 216 via the conduit, diaphragm 238 will relax or move to the non-expanded condition causing the pushbutton B to move outwardly to again protrude from housing H.

Figure 7:
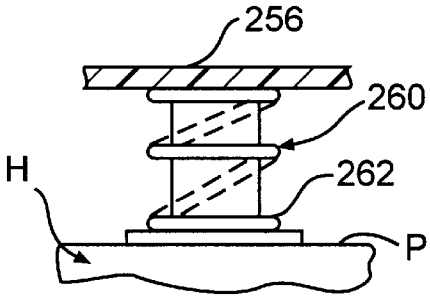
FIG. 7 is a broken, fragmentary view, partly in section, of a pressure adjustment mechanism for the fluidic operators according to the present invention.

FIG. 7 illustrates a pressure adjustment mechanism 260 for the fluidic operators according to the present invention to allow adjustment of the pressure required to operate the electric switches. The pressure adjustment mechanism 260 is illustrated in FIG. 7 incorporated in the fluidic operator 212 and includes a non-metallic spring 262, such as a helical coil spring, disposed around pushbutton B and mounted in compression between pressure plate 256 and the surface P of housing H. Accordingly, when the resistance or force of spring 262 is greater than the resistance or force of pushbutton B, the positive pressure required to overcome the force of spring 262 in order to depress the pushbutton B will be greater than the positive pressure required to overcome the force of the pushbutton alone. By using springs of various strengths in the fluidic operators, the pressure required to operate the electric switches can be selectively controlled. In other words, the positive pressure in the reservoirs required to operate the electric switches can be varied or adjusted in accordance with the force constant of the springs, and springs having various known force constants can be selected for use in the fluidic operators to obtain operation of the switches in response to predetermined positive pressures in the reservoirs.

Figure 8:
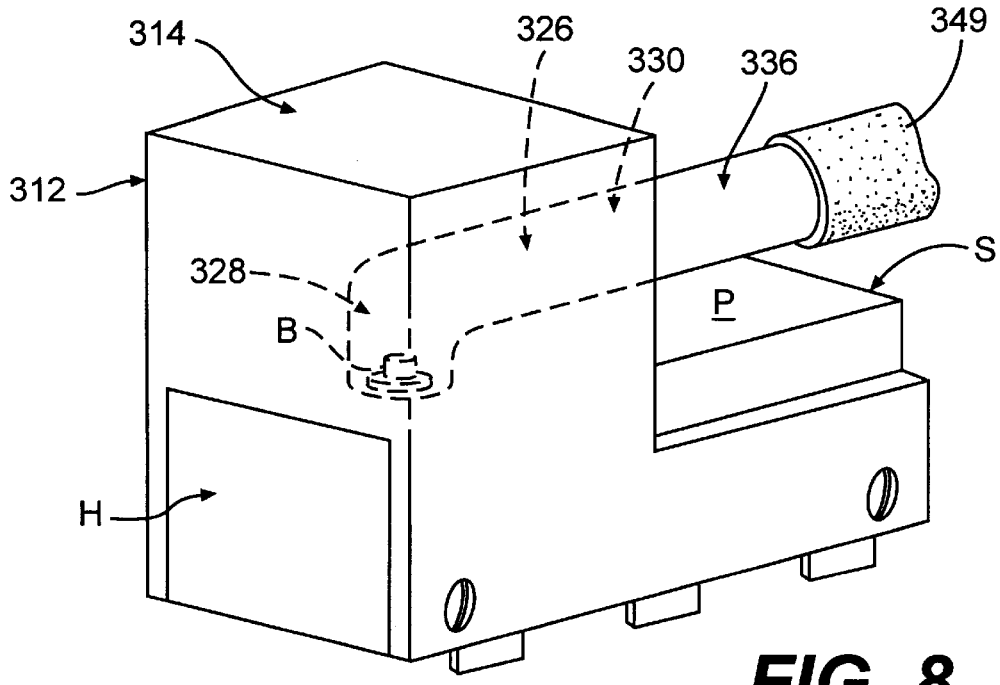
FIG. 8 is a broken, perspective view of a further modification of an electromagnetically transparent fluidic operator according to the present invention mounted to an electric switch to form a remotely operable electric switch assembly.
Figure 9:
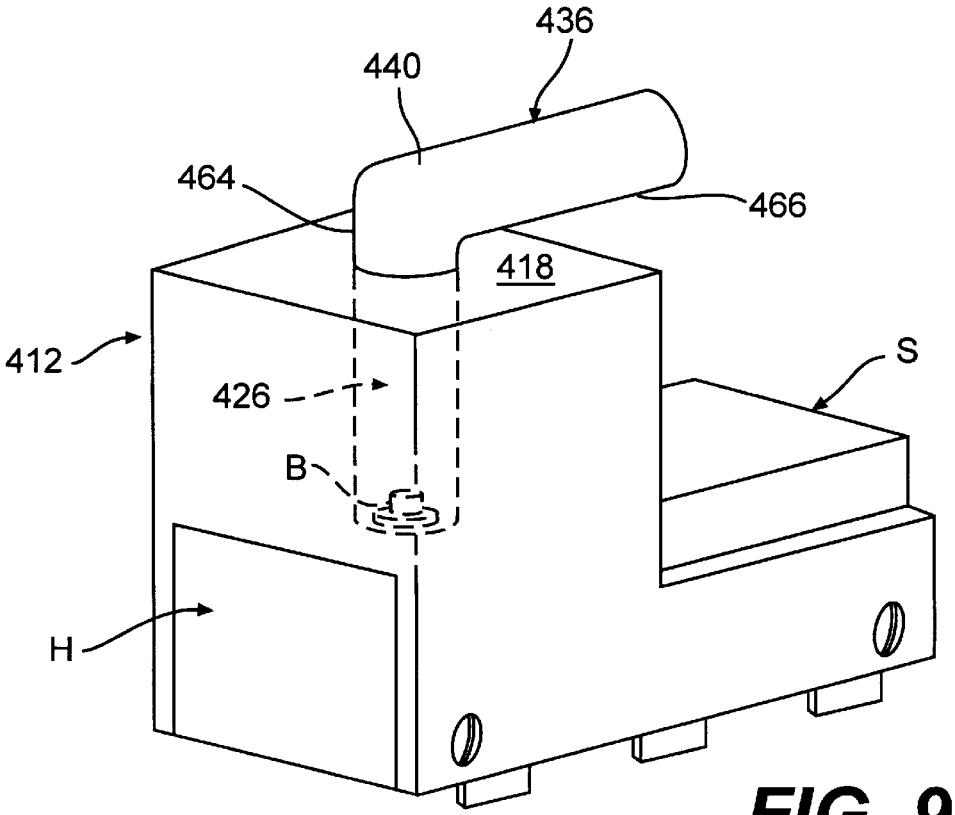
FIG. 9 is a broken, perspective view of an additional modification of an electromagnetically transparent fluidic operator according to the present invention mounted to an electric switch to form a remotely operable electric switch assembly.

FIGS. 8 and 9 illustrate additional alternative embodiments of electromagnetically transparent fluidic operators according to the present invention having alternative nipple arrangements. The fluidic operator 312 illustrated in FIG. 8 is similar to the fluidic operator 12 except that nipple 336 for fluidic operator 312 protrudes from the rear surface of housing 314 parallel with surface P of switch housing H. Nipple 336, which is angularly offset from the longitudinal or axial direction of movement of the pushbutton B normal to the surface P of housing H, is secured in a chamber 326 of housing 314. The chamber 326 has an outer chamber section 330 receiving nipple 336 and an inner chamber section 328 disposed at an angle of 90° with outer chamber section 330. The chamber 326 is of uniform cross-sectional diameter or size along the length thereof. The inner chamber section 328 is longitudinally aligned with pushbutton B and the diaphragm (not shown) of the fluidic operator is disposed in the chamber 326. Accordingly, when fluid is supplied to the expandable reservoir via conduit 349, the housing 314 confines the diaphragm and, therefore, the reservoir, to expand in the direction of movement of pushbutton B to turn the electric switch "on". The fluidic operator 412 illustrated in FIG. 9 is similar to the fluidic operator 312 except that nipple 436 of fluidic operator 412 has an angled outer portion 440 including a first segment 464 rigidly secured in a chamber 426 of housing 314 and a second segment 466 disposed at an angle of 90° with first segment 464. Chamber 426, which has a uniform cross-sectional diameter or size along the length thereof is longitudinally aligned with pushbutton B, and the first segment 464 of the nipple enters the chamber 426 at the opening therealong the upper surface 418 of housing 414. Accordingly, if should be appreciated that the nipples and the chambers of the housings can have various non-straight configurations as well as straight configurations.

The fluidic operators according to the present invention represent simple, near zero-cost adaptations of conventional electric switches for operating the electric switches remotely. The fluidic operators can be adapted to a chosen electric switch for only a fractional percentage, typically less than one percent, of the cost of the electric switch itself. The fluidic operators are compatible with electromagnetic testing and experimentation and are electromagnetically transparent at radio frequencies and at least electromagnetically translucent at microwave frequencies. Although the electric switch itself may contain small metallic contacts and leads, the fluidic operators add nothing metallic that would influence the electromagnetic characteristics of the associated system. The fluidic operators can be operated in various positions other than the vertical position illustrated herein. The fluidic operators can be easily adapted to various types of off-the-shelf electric switches of different sizes and configurations. Various types of fluids can be utilized in the fluidic operators including various gases. Various pressure adjustment mechanisms can be incorporated in the fluidic operators to selectively control or adjust the positive pressures required to operate the electric switches. With the use of a pressure adjustment mechanism, operation of the electric switches can be obtained in response to predetermined positive pressures in the reservoirs of the fluidic operators.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. An electromagnetically transparent fluidic operator for attachment to an electric switch for operating the electric switch remotely, the electric switch having a switch housing and a mechanical actuator for operating the electric switch in response to an operating force applied against the mechanical actuator, said fluidic operator comprising:

a fluidic housing made of non-metallic material for being rigidly mounted to the electric switch and having a chamber therein aligned with the mechanical actuator when said fluidic housing is mounted to the switch housing; and an expandable reservoir made of non-metallic material rigidly mounted to said fluidic housing and including a nipple rigidly attached to said fluidic housing and a deformable diaphragm forming a seal with said nipple, said diaphragm being arranged in said chamber to be disposed close to the mechanical actuator, said nipple having an opening therein for receiving fluid from a remote location to deform said diaphragm, said diaphragm being confined by said fluidic housing such that said deformed diaphragm applies the operating force.

2. An electromagnetically transparent fluidic operator as recited in claim 1 wherein said fluidic housing has a passage therein for receiving the electric switch.

3. An electromagnetically transparent fluidic operator as recited in claim 2 wherein said diaphragm has a closed end disposed adjacent the mechanical actuator and an open end having a peripheral edge forming said seal with said nipple.

4. An electromagnetically transparent fluidic operator as recited in claim 3 wherein said diaphragm is confined by said fluidic housing to cause said reservoir to expand in the direction of movement of the mechanical actuator.

5. An electromagnetically transparent fluidic operator as recited in claim 4 and further including a non-metallic pressure plate disposed in said chamber between said diaphragm and the mechanical actuator.

6. An electromagnetically transparent fluidic operator as recited in claim 1 wherein said nipple is threadedly attached to said fluidic housing.

7. An electromagnetically transparent fluidic operator as recited in claim 1 wherein said fluidic housing comprises a first tubular member and said nipple comprises a second tubular member pressed into said first tubular member.

8. An electromagnetically transparent fluidic operator as recited in claim 7 wherein said first and second tubular members are made of polyvinylchloride.

9. An electromagnetically transparent fluidic operator as recited in claim 1 wherein said diaphragm is made of latex rubber.

10. An electromagnetically transparent fluidic operator as recited in claim 1 wherein said fluidic operator is electromagnetically transparent at radio frequencies.

11. An electromagnetically transparent fluidic operator as recited in claim 10 wherein said fluidic operator is electromagnetically translucent at microwave frequencies.

12. An electromagnetically transparent fluidic operator as recited in claim 1 and further including an adjustment mechanism disposed in said fluidic housing for selectively adjusting the operating force required to be applied by said diaphragm against the mechanical actuator to operate the electric switch.

13. A remotely operable electric switch assembly comprising:

an electric switch having a switch housing and a mechanical actuator protruding from said switch housing and being movable relative to said switch housing to operate said electric switch; and an electromagnetically transparent fluidic operator attached to said electric switch for operating said electric switch remotely, said fluidic operator including a fluidic housing attached to said switch housing, expandable reservoir disposed in said fluidic housing and a source of fluid coupled with said reservoir for pressurizing said reservoir from a remote location, said reservoir including a nipple rigidly attached to said fluidic housing and a deformable diaphragm disposed adjacent said mechanical actuator and having a peripheral edge forming a seal with said nipple, said diaphragm being deformable to cause said reservoir to expand in response to pressurization of said reservoir with said fluid, said reservoir being confined by said fluidic housing to expand in the direction of movement of said mechanical actuator to move said mechanical actuator to open said electric switch.

14. A remotely operable electric switch assembly as recited in claim 13 wherein said electric switch is a momentary pushbutton electric microswitch and said mechanical actuator is a pushbutton.

15. A remotely operable electric switch assembly as recited in claim 14 and further including a pressure plate interposed between said diaphragm and said pushbutton.

16. A remotely operable electric switch assembly as recited in claim 15 and further including a spring mounted in compression between said pressure plate and said switch for selectively adjusting the pressure required in said reservoir to move said mechanical actuator.

17. A method of adapting an electric switch for fluidic, remote operation comprising the steps of:

selecting an electric switch to be adapted for remote operation, the switch having a switch housing and a mechanical actuator for operating the electric switch in response to an operating force applied against the mechanical actuator; and attaching an electromagnetically transparent fluidic operator to the electric switch, the attacthing step including rigidly attaching a non-metallic housing to the electric switch such that a chamber in the non-metallic housing is aligned with the mechanical actuator;

positioning a non-metallic, stretchable diaphragm in the chamber close to the mechanical actuator;

rigidly attaching a non-metallic nipple to the non-metallic housing;

establishing a seal between the nipple and the diaphragm to form a fluid-tight reservoir; and supplying fluid to the reservoir from a remote location to stretch the diaphragm and pressurize the reservoir to apply an operating force against the mechanical actuator to operate the electric switch.

18. A method of adapting an electric switch for fluidic, remote operation as recited in claim 17 and further including the step of positioning a non-metallic pressure plate between the diaphragm and the mechanical actuator such that the diaphragm applies pressure against the pressure plate and the pressure plate applies pressure against the mechanical actuator to operate the electric switch.

19. A method of adapting an electric switch for fluidic, remote operation as recited in claim 18 and further including the step of positioning a non-metallic spring between the pressure plate and the electric switch to adjust the fluidic pressure required in the reservoir to operate the electric switch.

* * * * *